(12) United States Patent
Gapontsev et al.

(10) Patent No.: US 9,435,945 B2
(45) Date of Patent: Sep. 6, 2016

(54) HIGH POWER METAL CLAD MODE ABSORBER

(71) Applicant: IPG PHOTONICS CORPORATION, Oxford, MA (US)

(72) Inventors: Valentin Gapontsev, Worcester, MA (US); Valentin Fomin, Burbach (DE); Mikhail Abramov, Burbach (DE); Anton Ferin, Burbach (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/308,357

(22) Filed: Jun. 18, 2014

(65) Prior Publication Data
US 2015/0370009 A1  Dec. 24, 2015

(51) Int. Cl.
*H01S 3/30* (2006.01)
*G02B 6/036* (2006.01)
*G02B 6/02* (2006.01)
*G02B 5/00* (2006.01)
*G02B 6/24* (2006.01)
*H01S 3/00* (2006.01)
*H01S 3/067* (2006.01)
*G02B 6/12* (2006.01)
*H01S 3/094* (2006.01)

(52) U.S. Cl.
CPC .............. *G02B 6/036* (2013.01); *G02B 5/003* (2013.01); *G02B 6/0208* (2013.01); *G02B 6/02033* (2013.01); *G02B 6/243* (2013.01); *H01S 3/0064* (2013.01); *H01S 3/067* (2013.01); *G02B 2006/12126* (2013.01); *H01S 3/005* (2013.01); *H01S 3/06754* (2013.01); *H01S 3/094007* (2013.01)

(58) Field of Classification Search
CPC .... G02B 6/036; G02B 6/0208; G02B 6/243; G02B 5/003; G02B 6/02033; G02B 2006/12126; H01S 3/067; H01S 3/0064; H01S 3/06733
See application file for complete search history.

(56) References Cited

U.S. PATENT DOCUMENTS

| | | | | |
|---|---|---|---|---|
| 8,948,218 | B2* | 2/2015 | Gapontsev | H01S 3/06708 372/6 |
| 9,213,135 | B2* | 12/2015 | Ilyashenko | G02B 6/02052 |
| 2010/0135339 | A1* | 6/2010 | Meleshkevich | G02B 6/03616 372/6 |

* cited by examiner

*Primary Examiner* — Yuanda Zhang
(74) *Attorney, Agent, or Firm* — Yuri Kateshov, Esq.; Timothy J. King, Esq.

(57) ABSTRACT

A clad absorber unit is provided on a passive fiber of a high power fiber laser system and operative to trap and remove high order modes propagating along the clad of the passive fiber. The mode absorber has a composition made from one or more liquid metals and alloys thereof which are placed in the opening formed in the sheath of the passive fiber. The composition is configured to remove from the cladding the MM light having a predetermined light power which heats the composition at a temperature lower than a threshold temperature at which the absorber may be damaged.

20 Claims, 3 Drawing Sheets

HIGH POWER METAL CLAD MODE ABSORBER

BACKGROUND OF THE DISCLOSURE

1. Field of Disclosure

The disclosure relates to high power fiber laser systems. In particular, the disclosure relates to a clad mode stripper/absorber operative to trap and remove undesirable cladding-guided light in passive fibers.

2. Prior Art

High power single mode fiber laser systems ("HPSM-FLS") are typically configured with one or more amplifying cascades each including an active double clad fiber which is either side- or end pumped by multimode (MM) pump light. The pump light propagating along a light-guide waveguide cladding is often not fully absorbed along the length of the active fiber and eventually coupled into a cladding of SM passive fibers. In addition, power losses at splices are also responsible for multimode light which propagates in a waveguiding cladding under a polymeric protective sheath. Besides, backreflecting light from the surface to be laser treated may also be coupled in the cladding. Even at moderate pump light absorption rates varying between 10-12 dB the clad-guided light can easily reach 300-600 W at the final amplifying stage. The clad guided light is undesirable for the following reasons.

Typically, the SM passive fiber of HPSMFLS is surrounded by a flexible polymeric protective sheath which has a lower refractive index than that of the cladding region. At fiber bends or spliced connections, the total reflection of the cladding region may be disturbed leading to the escape of clad-guided light into the protective sheath. As a consequence, the protective sheath may be overheated and destroyed. Furthermore, the MM radiation carried in the cladding may damage the end regions of the fiber which is typically a passive, SM delivery fiber or SM passive fiber coupled between two gain blocks, one of which, for example, is pumped in a direction counter to the signal propagation. Finally, if the clad-guided MM radiation reaches the end of the delivery fiber, the beam quality of the transmitted light signal may be worsened, which can adversely affect other optical components and the processing quality.

Devices configured to remove clad light and convert the light energy into the heat energy are known as cladding mode absorbers ("CMA"). Typically, a CMA is provided along a length of fiber stripped from the protective sheath, which covers the cladding, and configured as a light-guide polymer compound with a refractive index higher than that one of the cladding. The polymer compound absorbers typically allow decoupling cladding light with a power up to about 100 to about 400 W.

Some of structural limitations of the known CMAs include a low resistance to mechanical stresses caused by non-uniform thermo-dependent expansion/contraction of fiber and CMA. Typically, mechanical stresses lead to micro bending losses in single mode ("SM") large mode area ("LMA") fibers and excitation of high order modes ("HOMs").

Still a further limitation is associated with a relatively low thermal conductivity of polymer compound leading to its high temperatures. A 110° C. temperature is generally considered critical, and higher temperatures lead to the destruction the CMA. This critical temperature can be even lower during abrupt temperature changes occurring upon energizing a fiber laser system.

A need therefore exists for a HPSMFLS configured with a CMA which is characterized by high temperature- and mechanical stress-resistant structure.

A further need exists for a method of manufacturing the improved CMA.

SUMMARY OF THE DISCLOSURE

These needs are satisfied by the disclosed metal light clad energy absorber ("MLCA") configured to absorb light while withstanding elevated temperatures and provide a stress-resistant structure.

One aspect of the disclosure relates to a MLCA which, in contrast to the known polymer compound-based absorbers, includes a filling of liquid metals and their alloys provided along a stripped region of protective coating. The filling is selected to absorb light and have a low melting temperature; high thermo-conductivity, desired density and good adhesion to the exposed cladding (quartz). As will be disclosed below, the disclosed absorber can withstand considerably higher input powers than known silicon-based absorbers.

A further aspect of the disclosure relates to improving the stress resistance of the disclosed MLCA. In particular the fiber with the absorber is further placed in a heat sink configured as a sleeve surrounding the filling and adhered thereto. Due to high thermo-conductive characteristics, the absorber operates as effective heat evacuating media between quartz and metal heatsink.

SPECIFIC DESCRIPTION

Figure 1:
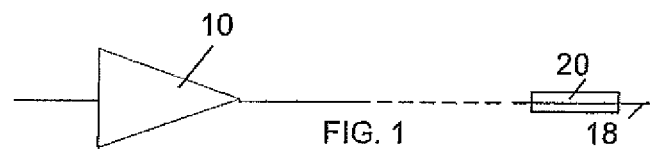
FIG. 1 is a diagrammatic view of a high power single mode fiber laser system ("HPSMFLS") provided with the disclosed metal light clad absorber ("MLCA")

Reference will now be made in detail to the disclosed energy absorber, high power fiber laser system incorporating the absorber and a method for manufacturing the latter. Wherever possible, same or similar reference numerals are used in the drawings and the description to refer to the same or like parts or steps. The drawings are in simplified form and are far from precise scale. For purposes of convenience and clarity only, directional terms may be used with respect to the plane of the drawing sheets and not be construed to limit the scope. Unless specifically noted, it is intended that the words and phrases in the specification and claims be given the ordinary and accustomed meaning to those of ordinary skill in the fiber laser arts.

FIG. 1 illustrates a diagrammatic view of a typical gain block 10 which is either alone or in combination with similarly configured gain blocks is operative to emit an output substantially SM beam reaching kW levels. The output beam is then delivered to the destination point by a delivery single mode ("SM") passive fiber 18. The latter is provided with a clad mode absorber 20 made from liquid metals, i.e., metals with a low-temperature melting point, or a combination of liquid metals and their alloy. The absorber 20, thus, is operative to trap and absorb unwanted modes guided along the clad of fiber 18.

Figure 1A:
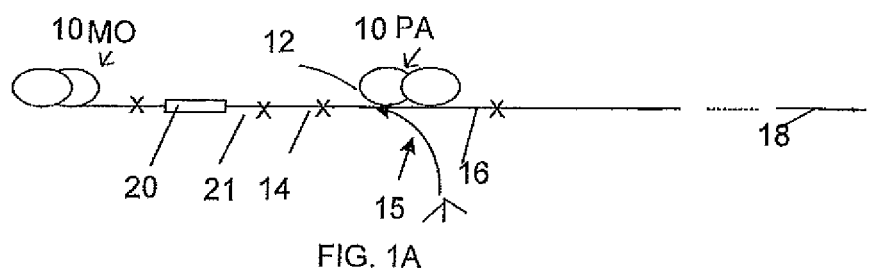
FIG. 1A is a diagrammatic view of a HPSMFLS including a master oscillator/power amplifier configuration ("MOPA") with the disclosed metal absorber provided on a passive fiber coupled between the components of the illustrated system.

FIG. 1A illustrates two gain blocks 10—components of MOPA, which as known to one of ordinary skill in the art, includes a master oscillator MO and a power amplifier PA. In this schematics, absorber 20, in addition to or alternatively to the delivery fiber, may be provided on a passive fiber 21 optically coupling the MO and PA, as shown. The fiber 21 may receive an unabsorbed pump signal from a pump 15 which, for instance, is coupled into the PA in a direction counter to a forward propagating direction of light signal.

The gain block 10, for example, power amplifier PA, includes an active fiber 12, i.e. the fiber doped with ions of one or more rare earth elements, such as ytterbium, erbium, thulium and etc, and single SM input and output passive fibers 14, 16, respectively. The active fiber 12 is configured with one or more claddings and a multimode core which, if desired, is configured to support substantially a fundamental mode at the desired wavelength. A multimode ("MM") pump light, emitted by a pump unit 15, is coupled into a waveguide cladding, and as it propagates therealong, is gradually absorbed by the core. Not all pump light is absorbed, some of it remains in the cladding. The unabsorbed pump and other differently originated and unwanted modes are guided further through the cladding of passive output fiber 16 and propagate further along the clad of delivery fiber 21. The existence of the clad light is highly undesirable for a variety reasons discussed previously and should be minimized and desirably totally eliminated. Note that while the above discusses single mode systems and fibers, the disclosed absorber may be used in conjunction with multimode fibers.

Figure 2:
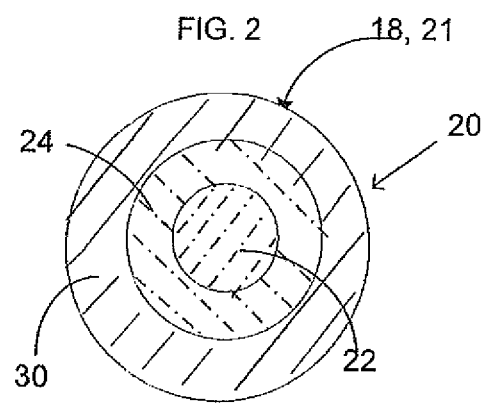
FIG. 2 is a diagrammatic view of a SM passive output fiber provided with the disclosed MLCEC.

Referring to FIG. 2, fiber 18 or 21, besides core 22 and cladding 24, is further configured with a protective polymeric protective film (stripped and thus not shown) with a refractive coefficient lower than that one of the cladding. To create conditions for absorbing clad propagating modes, the film is stripped along a desired axial region of fiber 18, 21 exposing a stretch of cladding 24 which may be immersed into absorber 20 made of a liquid-base metal and/or its alloys 30. The metal, in contrast to polymer compound, has excellent reflective characteristics. The clad light and particularly those modes that propagate along the border between the metal coating and quartz periodically impinge upon the former. A large portion of light incident on metal 30 is absorbed; the rest continues its propagation and is eventually greatly reduced or completely eliminated. The metal absorber 20 can withstand high mechanical stresses, higher temperatures and, although the absorption is still limited, it is distributed better than in traditional polymer compounds. Selecting the optimal composition of absorber 20 based on the known parameters of the entire fiber system and the desired location provide the removal of clad light with a maximum possible light power that can heat the composition at a temperature lower than a threshold temperature known to damage absorber 20 and other optical components of the system.

While it is possible to simply apply and adhere liquid metal to quartz, surface stresses may still be considerable because of imperfect adhesion of the liquid metal to the quartz. Hence, the surface of quartz is textured so that it is not smooth but has microscopic formations which improve a bond between quartz/clad and metal absorber. Also, the latter is selected to have a coefficient of thermal expansion close to that one of silicon, which also reduces mechanical stresses.

Liquid metals and their respective alloys exist in a liquid phase at room or about room temperatures and may include, among others, Gallium ("Ga") and its alloys, such as Galinstan. The latter is a composition of 68% Ga (Gallium), 21.5% In (Indium) and 10% Tin Sn and has a freezing point of about −19° C. after which this material tends to expand. Galinstan, like other liquid metals and alloys, has a high degree of thermal conductivity which is superior to polymer compound and thus has excellent heat conducting and dissipating characteristics. The tests show that energy absorber made of this alloy can safely dissipate higher than 600 watts of optical power of the clad-guided light. The composition of alloy may be altered to withstand higher powers reaching a kW level. In particular, the mass fraction of the alloys' components is controllably adjusted so that MM light is removed from the cladding with a maximum possible light power heating the alloy at temperatures lower than a threshold temperature known to damage it.

Figure 3:
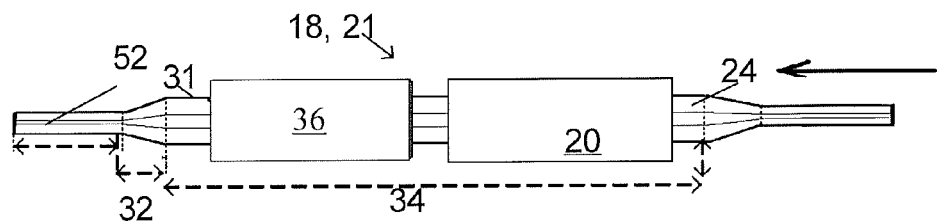
FIG. 3 is a diagrammatic view of a modified SM output fiber provided with the disclosed MLCEC.

Referring to FIG. 3, to reduce a high power density of clad-guided MM light and somewhat alleviate thermal loads on absorber 20, preferably, passive fiber 18, 21 may have a double bottleneck-shaped cross-section, which is also referred to as a twin bottle ("TB") fiber. The TB geometry is disclosed in detail in co-pending applications U.S. Ser. No. 12/559,284 and U.S. Ser. No. 12/630,545 assigned commonly with the instant application and fully incorporated herein by reference. The configuration of TB fiber 18 or 21, thus, includes spaced apart relatively uniform small-diameter end regions 52, relatively uniform large-diameter central region 34 and transition regions 32 between respective end and central regions which allow adiabatic expansion of guided light. Based on the foregoing considerations, absorber 20 is preferably, but not necessarily, provided along central region 34 where the power density is relatively low. The diameter of absorber 20 may be the same as the outer diameter of polymeric sheath or film 31 or greater than the latter. TB fiber 18, 21 may further have another absorber 36 made of polymer compound which is located downstream from absorber 20. The central region 34 of fiber 18 may be configured with about a 300-micron diameter.

Figure 4:
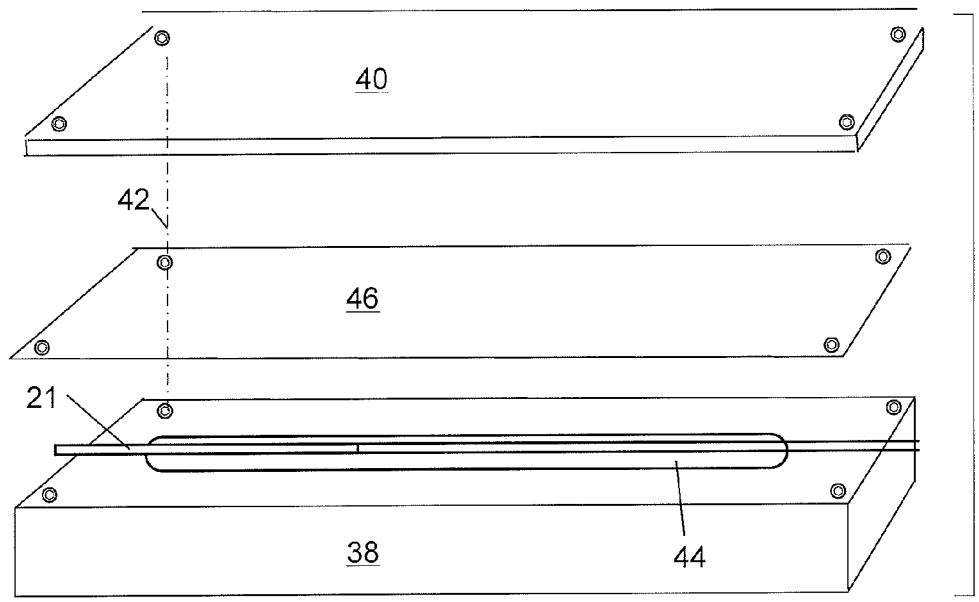
FIG. 4 is an exploded view of the disclosed MLCA mounted in a heat sink.

Referring now to FIG. 4, high light powers may require a heat sink made from a ductile material, such as copper, wolfram alloys with copper and others which are configured with good thermal conductivity and minimal thermal expansion preventing fiber stresses. The preferred housing material does not react with the metal alloy. The sink includes a first part 38 and a second part 40 detachably coupled to one another by fasteners 42, only one of which is shown, and configured to enclose a length of passive fiber 18, 21. The length of the latter is placed in a groove 44 filled with absorber 20 and provided in part 38. The opposite ends of the fiber's stretch within groove 44 are coupled to part 38 by an adhesive, such as silicone Gel. The latter is also applied to absorber 20 and any other stripper provided on fiber 18, which may be also located in groove 44, so as render the structure hermetical. To prevent overheating of housing part 40, which covers the entire unit, and even further improve the air tightness of the unit, a foil 46, which may be made, for example, from Al, is packed between the fiber length and part 40. Alternatively, Silicone Gel, UV glues or epoxy may fully cover absorber 20 without the use of part 40. These materials are flexible and efficiently compensate for thermal expansion of the metal.

Figure 5:
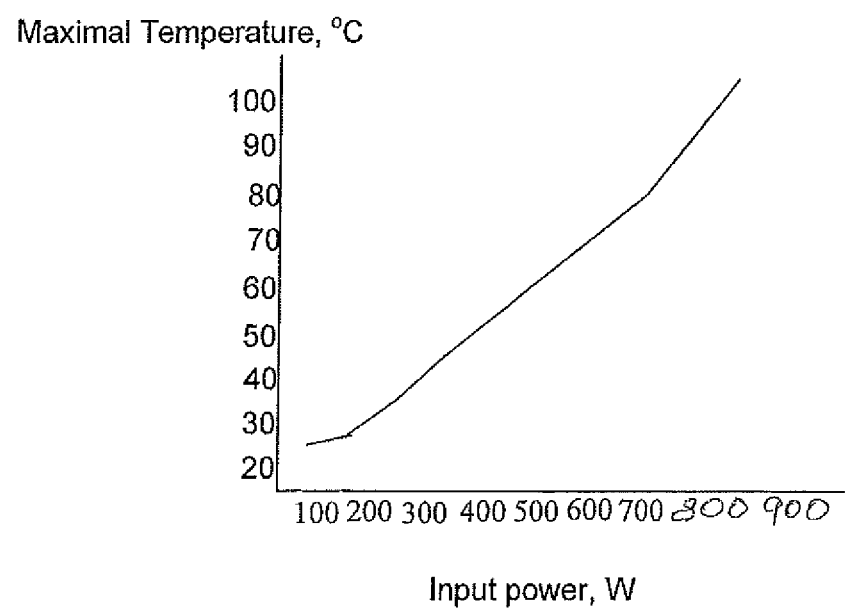
FIG. 5 is a graph illustrating dependence of maximal temperature of the sleeve of the MLCEC from dispersed power.

FIG. 5 illustrates the temperature of the heat sink or housing enclosing the length of fiber 18 with the disclosed absorber from the dispersed power. Even with powers reaching 800 W, the absorber preserves its structural integrity.

The disclosed absorber is particularly advantageous in the context of high power fiber laser systems. Although the above has mostly referred to the stripping capability of absorber 20 of forward propagating light, it also serves as a filter of backreflected light. Also, while the above disclosed configuration is described in the context of SM systems, the disclosed absorber can be efficiently used in MM systems as well. For example, it may be provided on a MM delivery fiber so as to minimize backreflection. Furthermore, the disclosed configuration may be used in both continuous wave and pulsed laser configurations.

Variety of changes of the disclosed structure may be made without departing from the spirit and essential characteristics thereof. Thus, it is intended that all matter contained in the above description should be interpreted as illustrative only and in a limiting sense, the scope of the disclosure being defined by the appended claims.

The invention claimed is:

1. A clad mode absorber unit ("CMA"), comprising:
   a passive fiber provided with a core, a cladding surrounding the core and capable of supporting an undesirable multimode ("MM") clad light, and a polymeric sheath coated upon the cladding, the sheath having a discontinuous surface which defines an opening terminating in a plane of the cladding; and
   an absorber covering an exposed portion of the cladding within the opening and having a composition which is selected from the group consisting of liquid metals and liquid metal alloys and a combination thereof, the composition being configured to remove the MM light having an optimal light power that heats the composition at a temperature lower than a threshold temperature at which the absorber is damaged.

2. The CMA unit of claim 1, wherein the absorber is made from material consisting of Gallium, Indium, and alloys thereof, the MM light having a power reaching a kW level.

3. The CMA unit of claim 1, wherein the absorber is configured from a Galistan alloy including a composition of Ga (Gallium), In (Indium) and Sn, wherein a mass fraction of each of the Ga, In and Sn is controllably varied to remove the predetermined light power.

4. The CMA unit of claim 1 further comprising a heat sink configured with first and second parts which are detachably coupled to one another, the first part being configured with a groove receiving a stretch of the passive fiber with the absorber, wherein the absorber is enclosed within the heat sink.

5. The CMA unit of claim 4, wherein the heat sink a metal base and a top coupled to the base, the top being selected from the group consisting of one or more malleable metals and Silicone Gel.

6. The CMA unit of claim 1, wherein the exposed portion of the cladding is textured so as to improve adhesion of the absorber to the cladding.

7. The CMA unit of claim 1, wherein the absorber is configured with a coefficient of thermal expansion selected to substantially match that one of the cladding.

8. The CMA unit of claim 7, wherein the passive fiber includes a core surrounded by the cladding and configured to guiding single mode light with powers reaching one or more kWs.

9. The CMA unit of claim 8, wherein the core and cladding each have a bottleneck-shaped cross-section including an input end region with a uniform diameter, a central region with a uniform diameter larger than that of the end region and a frustoconical transition region bridging the end and central region, the absorber extending over at least a portion of the central regions.

10. The CMA unit of claim 8, wherein the core and cladding each have a double bottleneck-shaped cross-section including spaced input end regions with a uniform diameter, a central region with a uniform diameter larger than that one of the end regions and frustoconical regions bridging opposite ends of the central region and respective end regions, the absorber extending over at least a portion of the central region.

11. The CMA unit of claim 8, wherein the core and cladding each have a double bottleneck-shaped cross-section including spaced input end regions with a uniform diameter, a central region with a uniform diameter larger than that one of the end regions and frustoconical regions bridging respective opposite ends of the central region and end regions, one of the transitional regions being longer than the other one, the absorber overlapping portions of respective central and longest frustoconical regions.

12. The CMA unit of claim 1, wherein the passive fiber is further provided with at least one additional absorber made from polymer compound and spaced from the metal absorber.

13. A method of manufacturing a clad mode absorber configured to remove multi-mode (MM) clad light from a cladding of a passive fiber, wherein the cladding is sandwiched between a core and a protective polymeric sheath, the method comprising:
   removing a stretch of the sheath from a desired location of the cladding so as to exposed a predetermined length of the cladding, thereby forming an opening in the sheath; and
   filling the opening with a composition including liquid metals or liquid metal alloys or a combination thereof, thereby covering the length of the cladding so as to remove an optimal amount of the MM light having a predetermined light energy which heats the composition at a desired temperature lower than a critical temperature at which the absorber is damaged.

14. The method of claim 13, wherein the absorber is made from material consisting of Gallium, Indium, and alloys thereof and having a coefficient of thermal expansion substantially matching that of the cladding.

15. The method of claim 13, wherein the absorber is configured from a Galinstan alloy including a composition of about 68% Ga (Gallium), about 21.5% In (Indium) and about 10% Sn, the composition having a freezing point of about −19° C.

16. The method of claim 13 further comprising:
   providing a first housing half made from a malleable metal with a groove;
   filling the groove with the mode absorber;
   placing a stretch of the passive fiber including the opening into the mode absorber, thereby covering the exposed length of the cladding; and detachably coupling a second housing half made from a malleable metal to the first housing half, thereby hermetically enclosing the stretch of the passive fiber with the absorber.

17. The method of claim 16 further comprising adhering opposite ends of the stretch to the first housing half with polymer compound.

18. The method of claim 13 further comprising texturing a surface of the exposed cladding before the application of the mode absorber.

19. The method of claim 13, wherein the passive fiber has a configuration having a bottleneck-shaped cross-section or a double bottleneck-shaped cross-section.

20. A high power fiber laser system, comprising:
a plurality of gain blocks spaced along a light path and each having an active fiber;
at least one pump unit operative to emit and couple multimode pump light into the active fiber, wherein a portion of the MM pump light is not absorbed in a core of the active fiber;
a plurality of passive fibers optically coupled to the respective active fibers and each having a cladding sandwiched between a core and a polymeric sheath, the polymeric sheath of at least one passive fiber having a discontinuous surface which defines an opening exposing a predetermined length of the cladding; and
a clad mode absorber provided in the opening and having a composition selected from liquid metal or liquid metal alloys or a combination thereof, the composition being configured to remove at least a portion the unabsorbed light having a predetermined light power which heats the composition along the predetermined length at a temperature lower than a threshold temperature at which the absorber is damaged.

* * * * *